P. KILLIN.
Churn.

No. 43,999. Patented Aug. 30, 1864.

WITNESSES
John Smair
Thomas Bufurt

INVENTOR
Patrick Killin

UNITED STATES PATENT OFFICE.

PATRICK KILLIN, OF MOUNT HEALTHY, OHIO.

CHURN.

Specification forming part of Letters Patent No. 43,999, dated August 30, 1864.

*To all whom it may concern:*

Be it known that I, PATRICK KILLIN, of Mount Healthy, in the county of Hamilton and State of Ohio, have invented a new and useful Improvement in Churns; and I do hereby declare that the following is a full, clear, and exact description of the same, reference being had to the accompanying drawings, making a part of this specification, in which—

Figure 1:
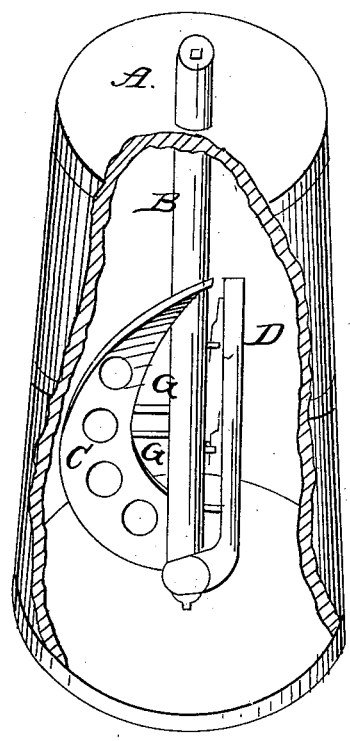
Figure 2:
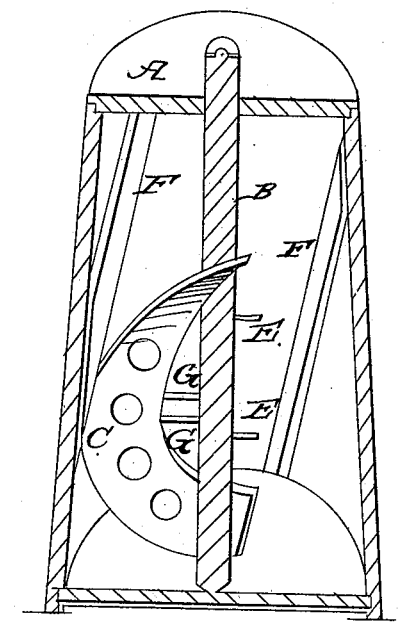
Figure 3:
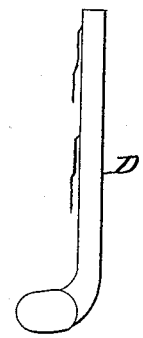

Figure 1 is a side view of a churn, cut away on one side, showing a spiral perforated breaker, C, and a tube, D, funnel-shaped at its base, attached to an upright revolving shaft, as placed for use. Fig. 2 is a section in part with tube detached. Fig. 3 is a side view of tube detached.

Similar letters of reference indicate corresponding parts in the figures.

This invention relates to a new and improved mode of churning by means of a revolving shaft placed upright in a churn, to which is attached a spiral-shaped break or paddle, perforated through its sides, as hereinafter fully shown and described, whereby the break in its revolutions agitates the liquid in all parts of the churn, and dashes it against strips placed on the sides of churn, and, in connection, immediately follows a tube suspended from and attached to the upright shaft, funnel-shaped at its base. In its revolution a vacuum is formed, causing a circulation of air through from top to bottom of tube, which extends above the cream, and to the bottom of churn, thereby circulating a sufficient quantity of air through every part of the churn by the agitation of the break in its revolutions. After the cream is formed into butter, the air-tube may be detached from the shaft and removed from the churn, while the butter is gathered by the revolutions of the break alone.

To enable others skilled in the art to fully understand and construct my invention, I will proceed to describe it.

A, Fig. 1, represents the churn, which may be constructed in the common way, with the top in halves, so as to be removed conveniently.

B, Fig. 1, is the upright movable shaft, which may be driven by a crank and common cog-wheels at the top.

C, Fig. 1, is a spiral break, bored through its sides to allow the cream to pass through, which causes friction, and made to fill the churn in width to one side and extend down to the bottom, also long enough to reach to the top, and fastened to the upright shaft at its side in the edge of the break, with a pin of wood or metal.

D, Fig. 1, is a tube, funnel-shaped at its base, made of tin or any suitable material, with hooks on the sides, and staples in the side of shaft B, so as to be detached during the gathering of the butter. Tube D, being funnel-shaped at its base, and the base being placed at the bottom of churn, and extending above the cream, allows a vacuum to be formed in the revolutions of the shaft B and break C.

The advantage gained by tube D being introduced during the process of forming the butter is, that it admits of a large quantity of air, and thus assists in the labor of forming butter.

E E, Fig. 2, are staples, to receive the hooks on D, Fig. 3.

F F, Fig. 2, are strips of wood fastened inside, as represented in Fig. 2, to serve as breakers.

Having thus described my invention, what I claim as my invention, and desire to secure by Letters Patent, is—

Suspending tube D, funnel-shaped at its base, upright and parallel from the side of shaft B in churn A, in combination with spiral perforated breaker C, substantially as and for the purpose herein set forth.

PATRICK KILLIN.

Witnesses:
THOMAS BUSSERT,
JOHN SNYDER.